(12) United States Patent
Hansen et al.

(10) Patent No.: US 11,870,842 B2
(45) Date of Patent: Jan. 9, 2024

(54) SYSTEM AND METHOD FOR DYNAMIC AUTO-SCALING BASED ON ROLES

(71) Applicant: Oracle International Corporation, Redwood Shores, CA (US)

(72) Inventors: Thomas Hansen, Burlington, MA (US); Ravi Malhotra, Bangalore (IN); Jyotisman Nag, Chicago, IL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/531,134

(22) Filed: Nov. 19, 2021

(65) Prior Publication Data

US 2022/0078230 A1   Mar. 10, 2022

Related U.S. Application Data

(63) Continuation of application No. 16/147,221, filed on Sep. 28, 2018, now Pat. No. 11,184,432, and a continuation-in-part of application No. 16/143,166, filed on Sep. 26, 2018, now abandoned.

(60) Provisional application No. 62/630,116, filed on Feb. 13, 2018, provisional application No. 62/565,049, filed on Sep. 28, 2017, provisional application No. (Continued)

(51) Int. Cl.
| | | |
|---|---|---|
| *H04L 67/1008* | (2022.01) | |
| *H04L 41/12* | (2022.01) | |
| *H04L 41/5019* | (2022.01) | |
| *H04L 41/5054* | (2022.01) | |
| *H04L 41/5009* | (2022.01) | |
| *G06F 9/50* | (2006.01) | |
| *H04L 67/1097* | (2022.01) | |
| *H04L 67/1004* | (2022.01) | |
| *H04L 41/50* | (2022.01) | |

(52) U.S. Cl.
CPC ........ *H04L 67/1008* (2013.01); *G06F 9/5072* (2013.01); *H04L 41/12* (2013.01); *H04L 41/5009* (2013.01); *H04L 41/5019* (2013.01); *H04L 41/5054* (2013.01); *H04L 67/1097* (2013.01); *H04L 41/5096* (2013.01); *H04L 67/1004* (2013.01)

(58) Field of Classification Search
CPC ............... H04L 41/145; H04L 41/5009; H04L 41/5054; H04L 41/5019; H04L 47/70; H04L 67/32; H04L 67/1002; H04L 67/10; H04L 41/5096; G06F 8/60; G06F 9/50; G06F 9/45558; G06F 2009/4557; G06F 2009/45562; G06F 9/5077; G06F 2209/5022
See application file for complete search history.

(56) References Cited

U.S. PATENT DOCUMENTS

| | | | |
|---|---|---|---|
| 9,716,634 B2 * | 7/2017 | Sapuram | ............ H04L 41/5096 |
| 10,333,789 B1 * | 6/2019 | Dippenaar | ............. H04L 63/00 |
| 11,184,432 B2 | 11/2021 | Hansen | |

(Continued)

*Primary Examiner* — Mohamed A. Wasel
*Assistant Examiner* — James Ross Hollister
(74) *Attorney, Agent, or Firm* — TUCKER ELLIS LLP (57) ABSTRACT

In accordance with an embodiment, a system and method for dynamic auto-scaling based on roles is provided. Within a system, a node, based upon a load demand, can be duplicated. Additionally, when duplicating a node, the role of the node can be used to determine various characteristics of the duplicated node, taking into account various factors.

20 Claims, 10 Drawing Sheets

Related U.S. Application Data

62/565,050, filed on Sep. 28, 2017, provisional application No. 62/565,051, filed on Sep. 28, 2017.

(56) References Cited

U.S. PATENT DOCUMENTS

| | | | |
|---|---|---|---|
| 2009/0043809 A1* | 2/2009 | Fakhouri | G06Q 10/06 707/999.102 |
| 2013/0198318 A1* | 8/2013 | Branson | G06F 9/44 709/217 |
| 2014/0075019 A1* | 3/2014 | Mordani | H04L 41/5058 709/224 |
| 2014/0344458 A1* | 11/2014 | Lee | H04L 47/76 709/226 |
| 2015/0120889 A1* | 4/2015 | Sapaliga | H04L 41/5041 709/221 |
| 2015/0180949 A1* | 6/2015 | Maes | G06F 9/5072 709/201 |
| 2016/0239595 A1* | 8/2016 | Maes | H04L 41/5054 |
| 2016/0241446 A1* | 8/2016 | Gupte | H04L 41/5058 |
| 2017/0139695 A1* | 5/2017 | Govindaraju | G06F 8/60 |
| 2017/0272335 A1* | 9/2017 | Hamlin | H04L 41/5045 |
| 2018/0159844 A1* | 6/2018 | Barfonchovski | G06F 8/60 |
| 2018/0359162 A1* | 12/2018 | Savov | H04L 41/0896 |
| 2019/0097895 A1 | 3/2019 | Hansen | |

* cited by examiner

SYSTEM AND METHOD FOR DYNAMIC AUTO-SCALING BASED ON ROLES

CLAIM OF PRIORITY

This application is a continuation of and claims the benefit of priority to U.S. patent application entitled "SYSTEM AND METHOD FOR DYNAMIC AUTO-SCALING BASED ON ROLES", application Ser. No. 16/147,221, filed Sep. 28, 2018, which application claims the benefit of priority to U.S. Provisional patent application entitled "PLATFORM SUPPORTING MULTIPLE CLOUD INFRASTRUCTURE MODELS", Application No. 62/565,049, filed Sep. 28, 2017; U.S. Provisional patent application entitled "PLATFORM TO MANAGE SERVICE RELATIONSHIPS AND RESOURCES USING META-LANGUAGE", Application No. 62/565,050, filed Sep. 28, 2017; U.S. Provisional patent application entitled "DYNAMIC AUTO-SCALING BASED ON ROLES", Application No. 62/565,051, filed on Sep. 28, 2017; and U.S. Provisional patent application entitled "SYSTEM AND METHOD FOR DYNAMIC AUTO-SCALING BASED ON ROLES", Application No. 62/630,116, filed on Feb. 13, 2018; this application is also a continuation-in-part of and claims the benefit of priority to U.S. patent application entitled "SYSTEM AND METHOD FOR DYNAMIC AUTO-SCALING BASED ON ROLES", application Ser. No. 16/143,166, filed on Sep. 26, 2018, which application claims the benefit of priority to U.S. Provisional patent application entitled "DYNAMIC AUTO-SCALING BASED ON ROLES", Application No. 62/565,051; and U.S. Provisional patent application entitled "SYSTEM AND METHOD FOR DYNAMIC AUTO-SCALING BASED ON ROLES", Application No. 62/630,116, filed on Feb. 13, 2018; each of which above applications and their contents are herein incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to cloud infrastructure models.

BACKGROUND

While more cloud providers and infrastructures are online, each cloud provider requires services that run within the cloud infrastructures to be specialized and designed solely for the cloud infrastructure within which the service is instantiated. What is desired is a system and method that allows for a service to be instantiated in multiple cloud infrastructure models. It is often desirable to provide the computing resources in a manner that is efficient, and in a way that provides various functionality and features. The complexity and amount of the resources to be allocated, variations in hardware and software for compatible configuration, desire to share resources, and other factors are often areas in which cloud computing can be improved.

SUMMARY

Described herein are systems and methods for dynamic auto-scaling based on roles, in accordance with an embodiment. An exemplary method can receive, at a platform service manager, a request to instantiate a service in one or more cloud infrastructures. The method can load, at the platform service manager, at least one provider, the at least one provider being associated with the one or more could infrastructures. The method can define, within the at least one cloud infrastructure, a compute region for the requested service, the compute region comprising one or more nodes. The method can deploy, by the platform service manager, the requested service to the one or more nodes. The method can detect, by an auto-scaling engine, a high load on a node of the one or more of nodes. The method can create a new node within the compute region, the new node comprising a copy of the node having the high load.

Approaches to computing include third party entities providing computing resources to customers or users via a network. The computing resources can include hardware and software that is allocated, configured and managed by the third party so that the third party's customer can select the amount and type of resources, and specify what is to be done with the resources. Often the customer may implement a system for further use by end-users, the customer's own customers, or others. These types of systems for providing computing resources are generally referred to as "cloud computing" and can provide various types of functionality over a network such as "software as a service," "platform as a service," "infrastructure as a service," etc.

Embodiments provide a system and method for dynamic auto-scaling based upon roles.

DETAILED DESCRIPTION

The invention is illustrated, by way of example and not by way of limitation, in the figures of the accompanying drawings in which like references indicate similar elements. It should be noted that references to "an" or "one" or "some"

embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Common reference numerals can be used to indicate like elements throughout the drawings and detailed description; therefore, reference numerals used in a figure may or may not be referenced in the detailed description specific to such figure if the element is described elsewhere.

Described herein are systems and methods for dynamic auto-scaling based on roles, in accordance with an embodiment.

Popular approaches to computing include third party entities providing computing resources to customers or users via a network. The computing resources can include hardware and software that is allocated, configured and managed by a party, such as a vendor, so that the vendor's customers/clients can pick and choose the amount and types of resources and applications that they would like to employ. In addition, the clients/customers can also specify what should be done with the resources.

In accordance with an embodiment, the clients/customers of the vendor can utilize the selected resources and applications in providing services/access to their own clients and customers, even just granting access to or the use of such resources and applications.

In accordance with an embodiment, such types of systems can be referred to as cloud computing, and often carry additional nomenclature, such as PaaS (Platform as a Service), SaaS (Software as a Service), IaaS (Infrastructure as a Service), and others.

In accordance with an embodiment, it is desirable to, with cloud computing systems, provide different and diverse infrastructures, services, platforms, or systems in a readily configurable and manageable manner. The complexity and amount of resources to be allocated, differences in hardware, software, and applications provide a complex landscape to navigate when attempting to switch between, or communicate between different infrastructures, services, platforms, and systems.

PaaS Service Manager (PSM)

In accordance with an embodiment, a PaaS (Platform as a Service) Service Manager (PSM) is a platform which users can use to develop services. PSM provides the infrastructure and integrations required to support these service's lifecycle operations. PSM can be loosely integrated with a public cloud infrastructure, such as Oracle Public Cloud (OPC), and thereby enables independent deployment and updates without dependency on the public cloud infrastructure's internal infrastructure. This allows services to be deployable on other topologies such as OPC Machine without any core changes.

In accordance with an embodiment, the platform is a single management run-time for multiple cloud models. In certain embodiments, a cloud provider can be, for example, Oracle Nimbula, OCI (Oracle Cloud Infrastructure), or an OpenStack implementation. The platform provides this capability via the implementation of an interface that encapsulates the specific concepts of the cloud provider in an abstract way. The service is built to run on one IaaS model and can work on others even where the model has resources that are in different geographical locations, use different node arrangements, use physically different hardware (e.g., computing, storage, network) and different software resources, can automatically work on others without any changes. When a service is created or managed, a compute region is selected and specific provider is loaded to use the cloud infrastructure via its APIs. The management platform itself is completely agnostic to the specific infrastructure being used.

In accordance with an embodiment, a platform can provided certain homogenous capabilities. For example, Cloud infrastructure provider can be selected during service creation based on tenant entitlements and available regions. A Service management and user interface is consistent regardless of selected cloud provider, even on private cloud. Services can be developed for one provider and are automatically available on others due to the abstraction layers provided by the platform.

Figure 1:
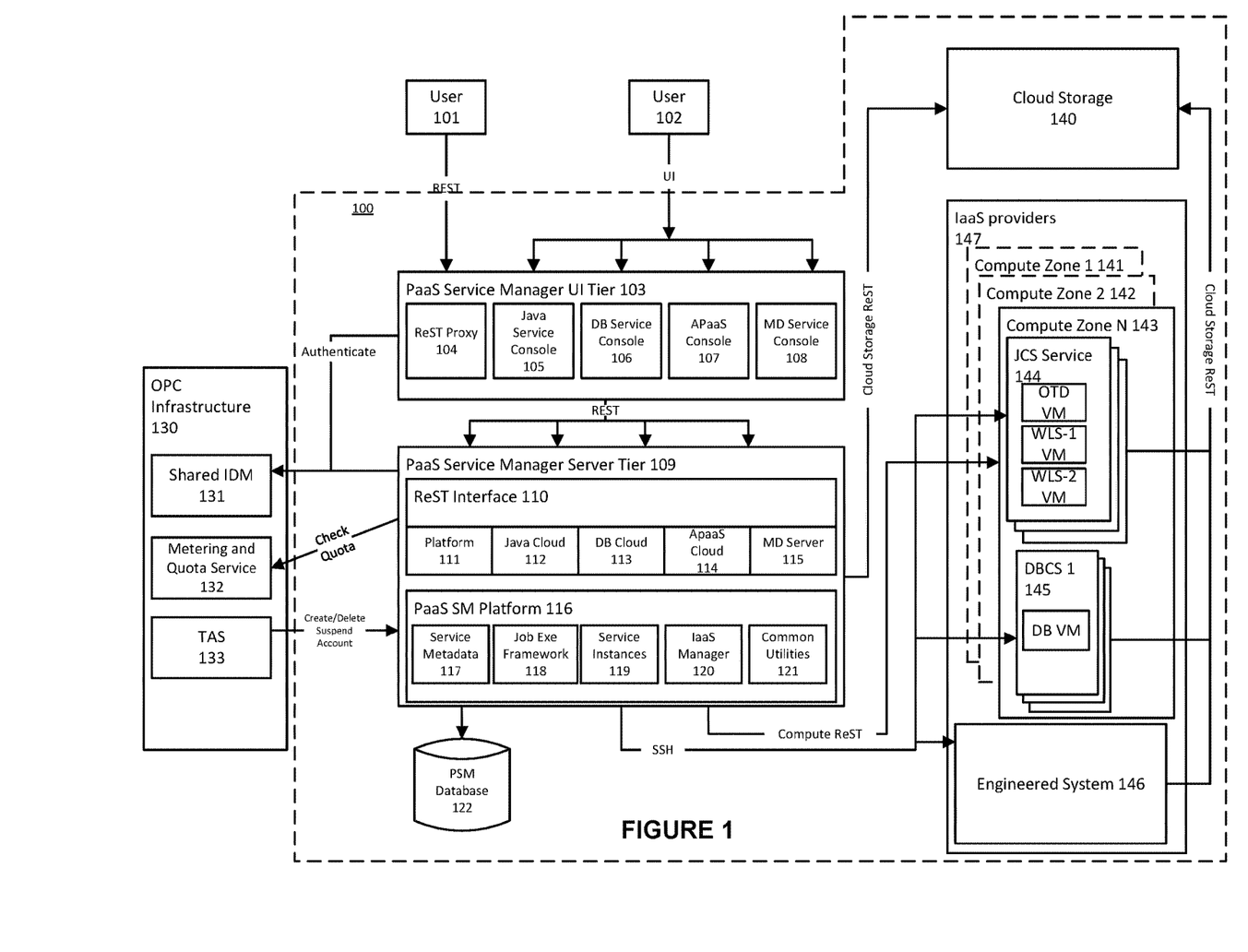
FIG. 1 shows a system for platform supporting multiple cloud infrastructure models, in accordance with an embodiment.

FIG. 1 shows a system for platform supporting multiple cloud infrastructure models, in accordance with an embodiment.

In accordance with an embodiment, a PaaS Service Manager (PSM) 100 (denoted by the dashed line within the figure) is a platform which allows for users to develop services. PSM provides the infrastructure and integrations to support these service's lifecycle operations. PSM can be loosely integrated with rest of a cloud infrastructure (such as, for example, Oracle Public Cloud (OPC)) and thereby enables independent deployment and updates without hard dependency on cloud internal infrastructure. This allows services to be deployable on other topologies such as OPC Machine without any core changes.

In accordance with an embodiment, PSM is deployed as two servers, such as WLS (WebLogic Servers) domains. The first server can provide a PaaS Service Manager UI Tier 103 for UI components, such as a Java Service Console 105, a Database Service Console 106, an APaaS (application platform as a service) console 107, and a metadata service console 108. In addition, the UI tier can provide a REST proxy 104. The second server can provide PaaS Service Manager Server Tier 109 for hosting service extensions, job management, and infrastructure services. The PaaS Service Manager Server Tier can provide a ReST interface 110 on top of a platform 111, java could 112, database could 113, APaaS cloud 114, and a metadata server 115. The PaaS Service Manager Server Tier can also provide a PaaS SM Platform 116, which can comprise service metadata 117, a job execution framework component 118, service instances 119, an IaaS manager 120, and common utilities 121. Components in both domains are deployed to a cluster. A sample flow of a Request to PSM User can submit requests to PSM using one of CLI (command line interface), a REST API, or a Public Cloud UI (such as Oracle Public Cloud Services UI).

In accordance with an embodiment, a number of IaaS providers 147 can be provided within the system. The PSM can instantiate various services within these IaaS providers and can provide a unified platform from which to interact with these various services. Each instance of an IaaS provider can comprise a number of compute zones 141-143, with each compute zone comprising an instance of a service 144 comprising a number of virtual machines as well as an instance of a database cloud service (DBCS) 145 comprising a database virtual machine (DB VM). Each IaaS provider can also comprise engineered system 146. Both the IaaS providers as well as the PaaS Service Manager Server Tier 109 can communicate with a cloud storage 140. The Server Tier can additionally communicate with a PSM database 122.

In accordance with an embodiment, each IaaS is a layer within the system. The computer zones (e.g., 141-143) do not have to be running the same infrastructure. Each compute zone provides an abstraction. A service, such as JCS service can start up an instance of the JCS service 144 and can start one or more compute zones with one or more virtual machines, such as a traffic director (OTD), or WebLogic server virtual machines. The service can then pass some data (e.g., credentials) that is specified in the metadata of the service that comes along with the service topology. All of this is provided to the VMs via abstraction.

In accordance with an embodiment, services are registered with two sets of information. A first information of information is a service blueprint that describes the topology of the service. This includes information about what the created VMs should comprise (e.g., how many storage volumes should each VM should have, how big should each VM should be, how much memory each VM should have . . . etc.). Such information can be expressed using a variable replacement language. Then, when instantiated, each service defines, within a compute zone, an instance of the service. Also in the blueprint is information about the services it will run, such as application level information, port configuration, security infrastructure . . . etc. These services can reference, for example, a public cloud infrastructure, such as Oracle Public Cloud 130, which can provide pre-defined services such as shared IDM (identity management) 131, metering and quota services 132, and TAS (tenant administration system) 133. In this way, developers who are developing a blueprint for a service to run via PSM can utilize pre-made services provided by a cloud infrastructure.

In accordance with an embodiment, a second information of a service is a declaration of binaries and tools that can be used, such as applications that will be installed and service tools. Service tools are a footprint that run on top of the service nodes that are created that are used by PSM and the service itself to run operations. For example: when a provisioning operation is run (create new instance of service), a service tool can specify that the PSM should use a blueprint to define the VMs that will be created. Service tools are also specified that will download onto each compute node, and this becomes the contract between the lifecycle operations the service supports, PSM, and the service itself.

In accordance with an embodiment, user 101 and 102 can interact with the PSM using a command line interface (CLI), or via http. Such users would normally include PSM administrators and/or developers. The CLI would usually be used to perform service development and maintenance activities.

In accordance with an embodiment, users can interact with the PSM using a REST Proxy. Such users would normally include service developers, who would utilize the REST API to develop new services and for testing of new and existing services. The REST proxy can provide a plurality of REST APIs for use by REST clients to communicate with the PSM, as well as the cloud services. The REST proxy can authenticate REST calls from REST calls, and translate the REST calls into GRPC calls. The REST proxy further provide REST APIs that support the same functions which are provided by a BCS (blockchain cloud service) management console.

In accordance with an embodiment, users can interact with the PSM using a Public Cloud UI (e.g., OPC Services UI). Such uses would usually include end users, who would utilize the UI to interact with the services provided via the PSM to request operations to be performed on the services instances.

In accordance with an embodiment, a PSM can provide a number of features, including, but not limited to: a) Service lifecycle operations are exposed from PSM client layer via a REST API, a CLI and a UI; b) Data driven model for defining new Service Types (e.g. JCS, DB, SOA, GG, etc.); c) Service Types can be layered, e.g.: SOA cloud service can be leverage the JCS and DBaaS services; d) Service Instance Registry: common entities for capturing PaaS service instances and their dependencies; e) Job engine for operations defined by service extension; f) Security: Authentication, authorization, CSF access, integration with shared IDCS for the extension; g) Persistence: Service extensions benefit from common JPA entities. Transaction management provided for REST endpoints and for operations; h) Job management APIs for devops to monitor the state of job execution; i) Asynchronous processing of customer requests, failover; j) Logging, HA, notifications, run-time monitoring, devops alerts, run-time properties; k) Handling of callbacks from TAS for metered-service life-cycle, and persisting of AppIds provisioned by TAS based on registered blueprints; l) Integration with Cloud UI and OPC infrastructure services (load-balancing, identity management, web authorization); and m) Abstraction of Compute/Storage Service in addition to value add capabilities such as queuing/retries.

In accordance with an embodiment, PSM can provide rapid service development, as well as the ability to develop a service once and deploy in multiple topologies. A PSM can also support complete lifecycle management.

In accordance with an embodiment, PSM can provide service scaling and compute management functions, such as a patching infrastructure, a backup infrastructure, as well as monitoring and diagnostics. The PSM can also handle, manage, and track compute resources, can provide for error handling and recover, can provide a common service delivery model. A PSM also provides independent deployment and updating to services without dependencies on cloud infrastructure.

In accordance with an embodiment, PSM supports the following lifecycle operations:
  Create—Provision a service.
  Delete—Delete a service.
  Start/Stop/Restart—Start, stop, or restart a service.
  Diagnostics—Retrieve service runtime diagnostics.
  Health Check Service—Check the state of the service and its components.
  Scale Out/Scale In—Increase or decrease the number of VMs that are executing components of a service.
  Scale Up/Scale Down—Increase or decrease the resources (processor, memory) assigned to components of a service.
  Update—Update some aspect of the service.
  Update Credentials—Update one or more of the credentials used by/with a service.
  Backup/Restore—Backup a service; restore a service from a backup.
  Patch Service Apply/Rollback—Apply patches to a service; rollback applied patches.
  Export Artifact/Import Artifact—Export/import an artifact.

In accordance with an embodiment, a service blueprint can be provided that allows service developers to define a service declaratively. The Service Blueprint can comprise a JSON document that comprises one or more of:
  Service Description.
  Service Tiers/Levels & Subscription types supported.
  Versioning of the blueprint, the service and its components for service release management.

Operations supported by the service. It is possible to support different operations by service level, subscription type, version and editions of the service.

Components—Software components that makes up the service.

PaaS and IaaS Resources required for the components and the service.

Credentials—Secure method to specify and transfer credentials. Support for username/password, SSH keys and binary blobs are available.

Attributes and Parameters—Specify the context required for the operations. These can be static, system generated, user input or runtime computed.

UI Customizations.

In accordance with an embodiment, when an end user (using the UI or a REST API) invokes one of the operations defined in the blueprint this can cause the PSM to remotely execute one more scripts on the VMs that host the components that make up a Service Instance. For example, a user's request to back up a service can result in PSM remotely executing a script on a VM that hosts a component of this service that backs up that component (with the details of what it means to "back up a component" being left up to the script). In order to accomplish this, it is not necessary for the PSM to be aware of or interact with the underlying semantics or structure of the services it manages. Service scripts can implement a Remote Execution Framework (REX) contract.

Figure 2:
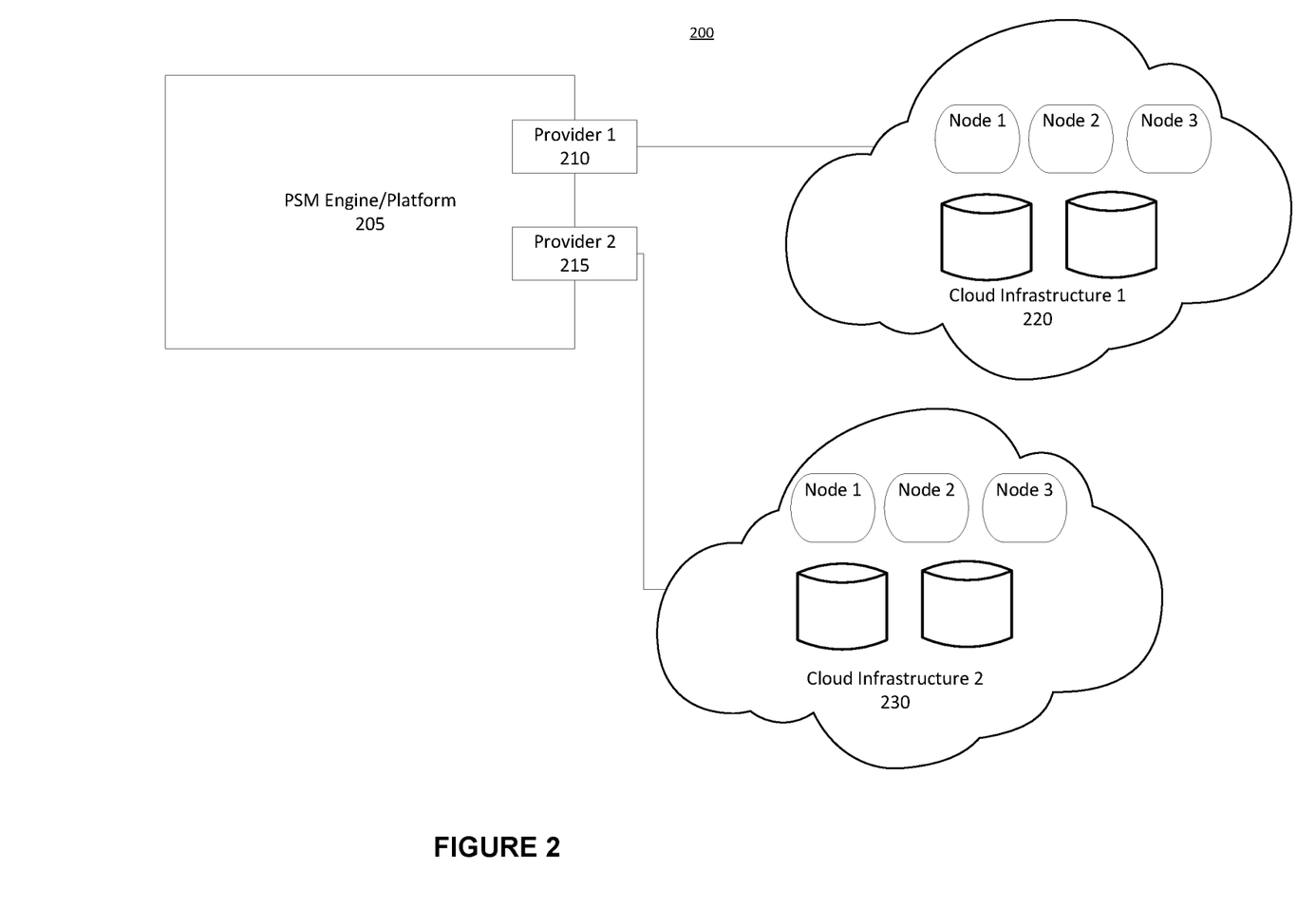
FIG. 2 shows a system for supporting multiple cloud infrastructure models, in accordance with an embodiment.

FIG. 2 shows a system for supporting multiple cloud infrastructure models, in accordance with an embodiment.

In FIG. 2, a system 200 supports a PSM Engine/Platform 205 that is using two distinct cloud infrastructure models, such as could infrastructure model 1 220, and cloud infrastructure model 2 230. The PSM Engine 205 can load different providers, depending on the cloud infrastructure models that are to be attached by the PSM Engine. In the depicted example, PSM Engine has loaded provider 1 210, and provider 2 215. Upon loading the providers 210 and 215, the PSM Engine can use a common interface to make a request to create compute nodes (shown within the infrastructure models), attach storage and networks, and open network traffic to and from the services running within the cloud infrastructures. As the PSM Engine creates resources, it can retrieve an abstract handle to the resource (e.g., a resource object), which can be used by the provider. The handle can be saved for later management operations.

In accordance with an embodiment, the platform provides for a single management runtime model for multiple cloud infrastructure models. The cloud infrastructure models (which can also be referred to herein as "cloud services"), being different, can vary in respective use and allocation of resources, provided applications, and hardware configurations. These differences can be seen between different cloud services provided by different companies, or even by a same company.

In accordance with an embodiment, the platform provides an interface that encapsulates the specific concepts of the cloud provider in an abstract manner. When a cloud service is created or managed, the compute region is selected and a specific provider is loaded to use the cloud infrastructure via its Application Programming Interfaces (APIs).

In accordance with an embodiment, in addition to the interface to the cloud APIs, an additional level of abstraction is provided for service nodes to access data properties provided for bootstrap operations (opc-init or cloud-init).

Figure 3:
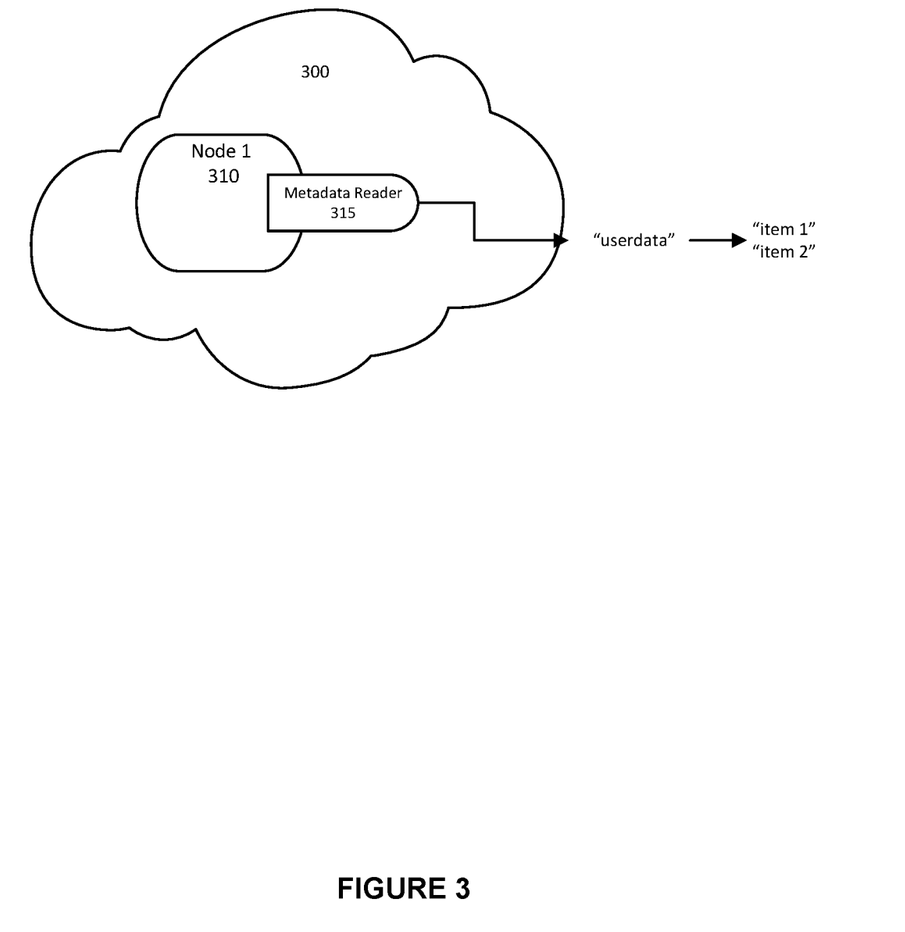
FIG. 3 shows a system for supporting multiple cloud infrastructure models, in accordance with an embodiment.

FIG. 3 shows a system for supporting multiple cloud infrastructure models, in accordance with an embodiment.

In accordance with an embodiment, a metadata reader 315 for a cloud infrastructure 300 is provisioned on each node 310. The metadata reader allows for common scripts to run on those nodes without regard for the details of the cloud platform. The metadata reader can be launched early in the node bootstrap cycle and before service specific scripts are run. This allows the service scripts to have a common model for accessing data that is passed from the platform to the provisioned service nodes. The data is defined in the service definition (blueprint) and can include all configuration information required by the service.

In accordance with an embodiment, the following is an example of data defined in the service blueprint for a service component called 'TestES':

"bootstrapAttributes": {
  "userdata": {
    "es_admin_port": "${Service.serviceComponents.TestES.attributes.ADMIN_PORT}",
    "es_cluster_name": "${Service.serviceComponents.TestES.attributes.CLUSTER_NAME}",
    "rollingRestart": "true",
    "componentName": "TestES"
  }
}

In accordance with an embodiment, as part of this definition, a hierarchy for the metadata in a key named 'userdata' is created. Within this hierarchy, four properties are defined, namely es_admin_port, es_cluster_name, rollingRestart and componentName. The values for the properties can come from other properties in the service. The metadata service allow access to this data on the provisioned service nodes using script commands, such as the following (or other mechanisms to perform HTTP GET)

adminPort='curl http://192.0.0.192/latest/attributes/userdata/es_admin_port'
clusterName='curl http://192.0.0.192/latest/attributes/userdata/es_cluster_name'
rollingRestart='curl http://192.0.0.192/latest/attributes/userdata/rollingRestart'
componentName='curl http://192.0.0.192/latest/attributes/userdata/componentName'

In accordance with an embodiment, this method of defining and accessing data within the service can work for any cloud provider (i.e., cloud service) selected via the compute region. The platform provides the appropriate reader for the specific cloud platform on the service nodes via the specific image.

Dynamic Auto-Scaling Based on Roles

In accordance with an embodiment, a metadata model associated with a service (e.g., the service blueprint) can provide the concept of 'role' based auto-scaling by using a 'clone' API. An auto-scaling engine can communicate to the PSM that it should create 'another node' that is a clone of an already running node that is suffering from performance issues (e.g., high CPU load, high memory load). As such, the topology of that node can be duplicated. The auto-scaling is seamless to the user in that the configuration for any nodes added to the service is completely automated and all software is installed and configured in order to make a duplicate of the node that is experiencing excess performance load.

In accordance with an embodiment, auto-scaling uses performance monitoring and thresholds to determine if auto-scale out will run. It can detect that a specific node is running short on, for example, processor or memory. When this determination is reached, the method can 'duplicate' or 'clone' the node and its properties.

In accordance with an embodiment, on auto-scaling, all 'servers' are provisioned on the new node. The specific software services and applications that were running on the original node can be duplicated, depending upon cardinality rules.

In accordance with an embodiment, all configuration is duplicated on the new node.

In order to describe the model, a theoretical service built on top of the platform providing the dynamic auto-scaling is described below with respect to FIGS. 4-8.

Figure 4:
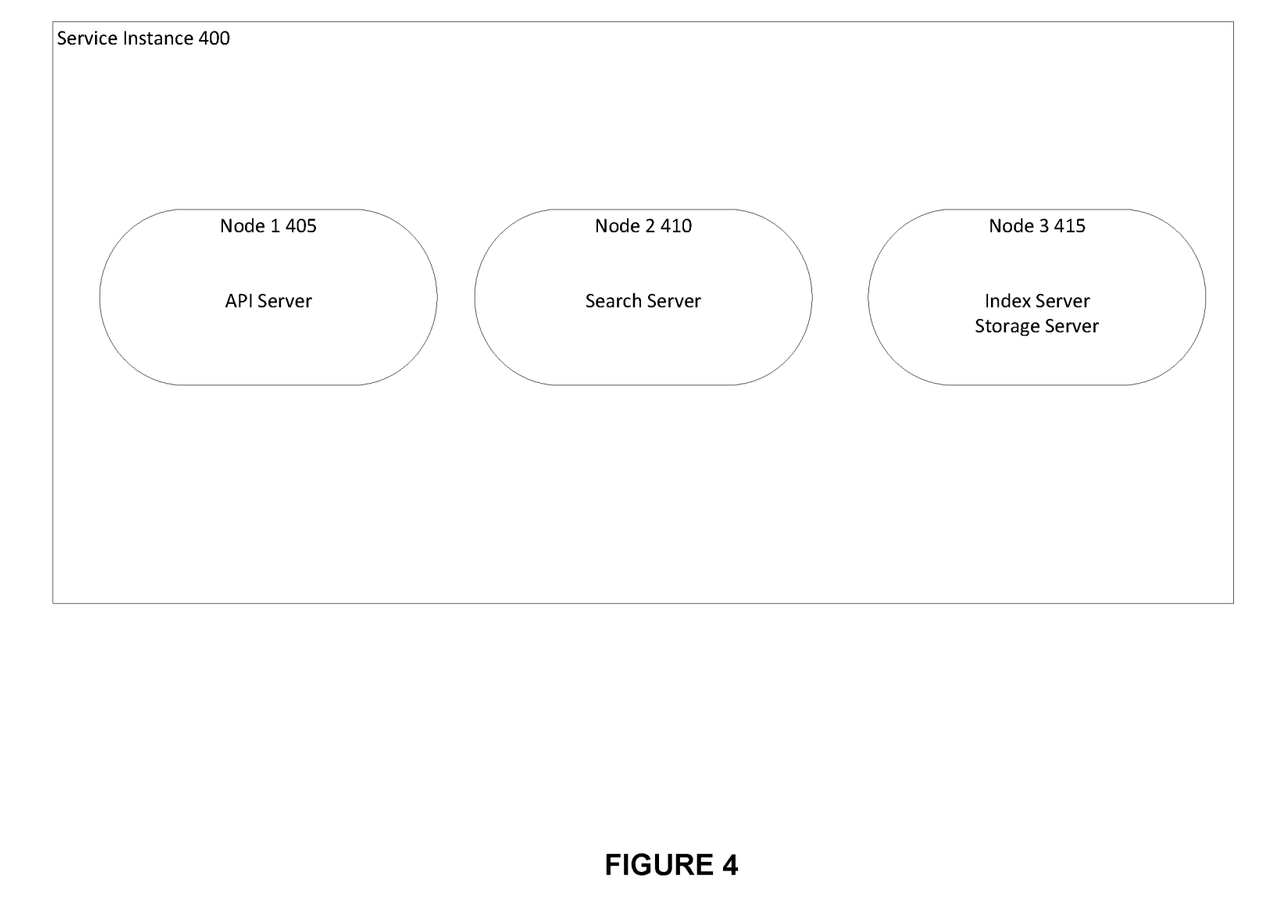
FIG. 4 shows a system for dynamic auto-scaling based on roles, in accordance with an embodiment.

FIG. 4 shows a system for dynamic auto-scaling based on roles, in accordance with an embodiment.

In accordance with an embodiment, FIG. 4 illustrates a theoretical search service instance 400 which is running the following nodes (e.g., that were defined in the blueprint and binaries fora search service registered with the PSM), Node 1 405, Node 2 410, and Node 3 415, with specific services running on each node. The service provides an API that is used for perform specific searches through data that the service stores. The API provides a service that has three specific functions: API (access), SEARCH (query, sort, etc.), DATA STORAGE and INDEXING. Each of these functions can have load based on how the service is used. For example, if the service is setup to contain a large amount of data, the storage server and indexes required may become large and require more compute or storage resources. This in turn could also mean that searching the data and providing sorts etc. could need additional memory, CPU, etc. If the number of requests that the service receives increases, the API server could become the bottleneck.

When the service is created, the blueprint of the serviced defined that there be one instance of each server: API, SEARCH, INDEX, and STORAGE. Based on server placement rules specified in the service definition, the INDEX and STORAGE server are placed on the same compute node, namely node 3 415. This is done to, for example, co-locate data and indexes.

Figure 5:
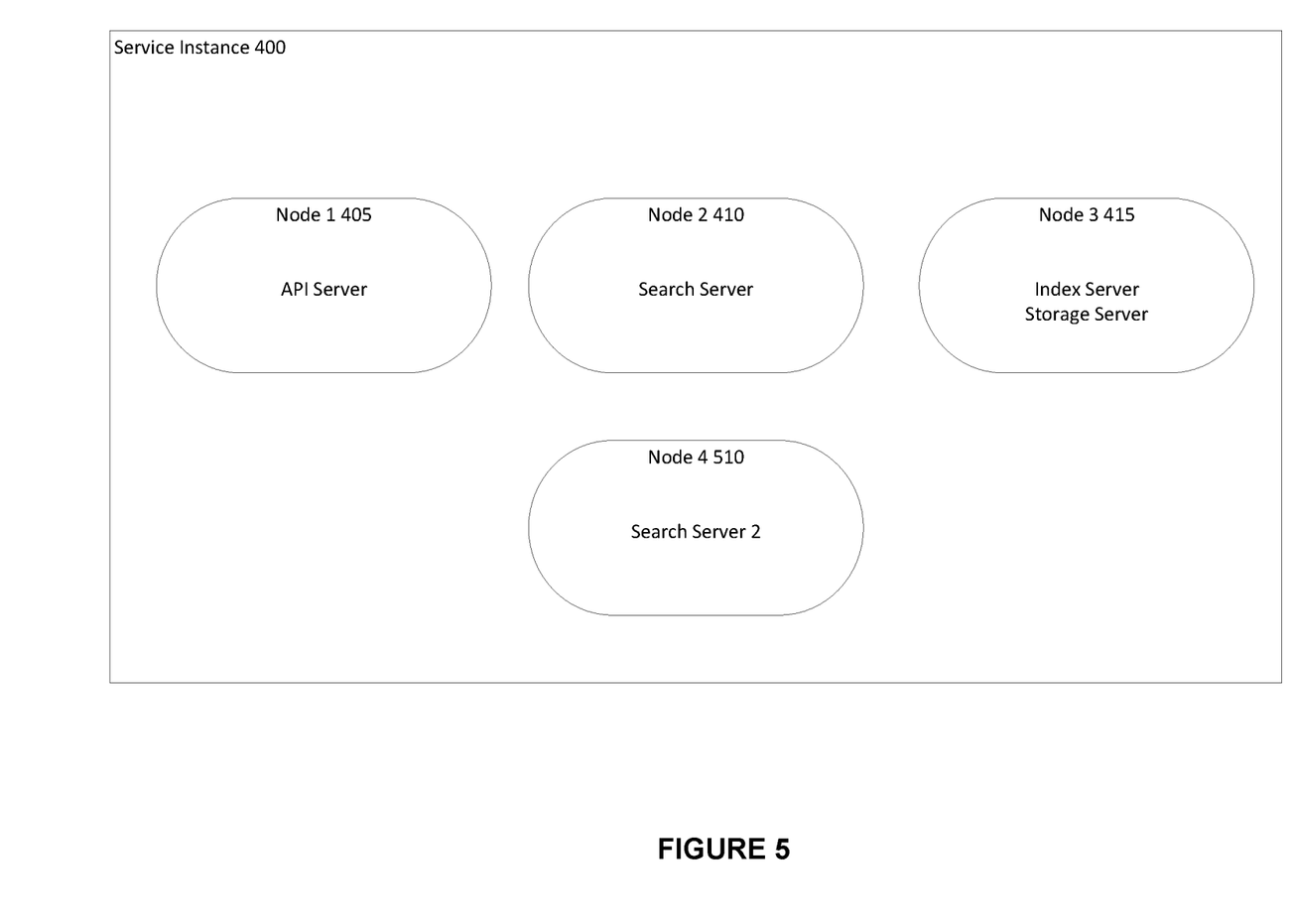
FIG. 5 shows a system for dynamic auto-scaling based on roles, in accordance with an embodiment.

FIG. 5 shows a system for dynamic auto-scaling based on roles, in accordance with an embodiment.

FIG. 5 depicts the system of FIG. 4, but after the auto-scaling engine determines that the CPU load is high on the Node 2. Upon such detection, the auto-scaling engine requests the metadata engine to make a duplicate of this node, namely Node 4 510. This could be the result of the complexity of the data or perhaps a combination of the large number of requests and the size of the data. As part of the auto-scaling function, the service can also be instructed to scale-out the service, providing the properties of the search server to make another one like it.

In accordance with an embodiment, the service definition controls the type of node created and servers placed on that node. Since the node running the search server was duplicated, the platform is instructed to duplicate that node and the servers it contains. This duplication logic will effectively scale the search function of the service and it should alleviate the high CPU consumption on the search node.

In accordance with an embodiment, the platform supports nodes that are running multiple servers (packing) via placement rules. In the example service, Node 3 is running both the INDEX server and the STORAGE server.

In accordance with an embodiment, after creation of the new Node 4, the service can specify that the API server create a new connection to search server 2, and that likewise, the index server and the storage server of Node 3 do the create a new connection to search server 2.

Figure 6:
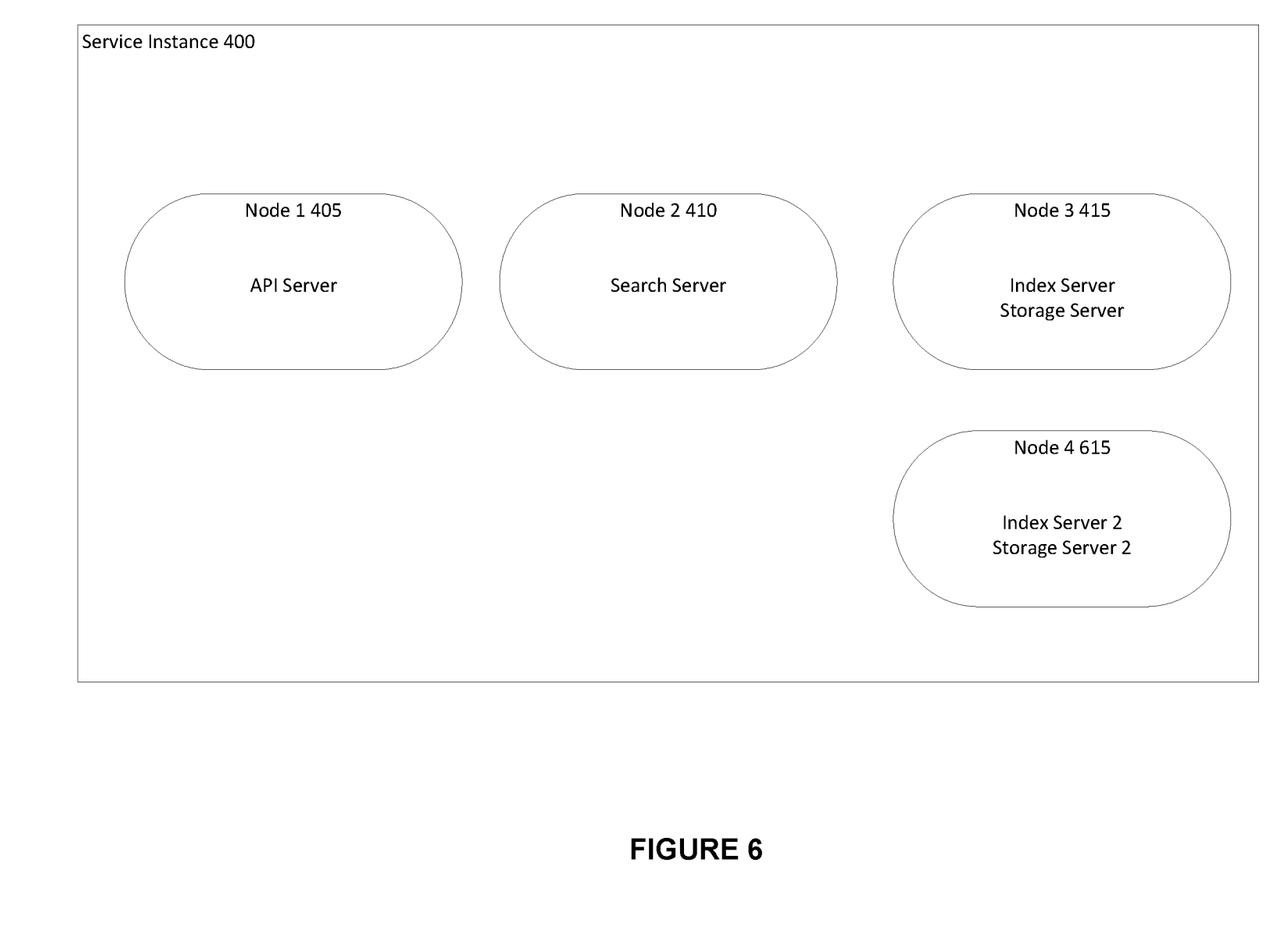
FIG. 6 shows a system for dynamic auto-scaling based on roles, in accordance with an embodiment.

FIG. 6 shows a system for dynamic auto-scaling based on roles, in accordance with an embodiment.

FIG. 6, depicts the system of FIG. 4 wherein an auto-scaling engine determines that the MEMORY usage is VERY high on Node 3. Based on this determination, Node 3 can be duplicated into Node 4 615, including all of node 3's servers. This duplication will create a second INDEX server and a second STORAGE server.

In accordance with an embodiment, the service definition controls the type of node created and servers placed on that node. Since the node running the INDEX and STORAGE servers was duplicated, the platform is instructed to duplicate that node and the servers it contains. This duplication logic will effectively scale the indexing and storage function of the service and it should alleviate the high memory consumption on Node 3.

In accordance with an embodiment, after creation of the new Node 615, the service can specify that connections between the other parts of the service and the newly created node are updated accordingly.

Figure 7:
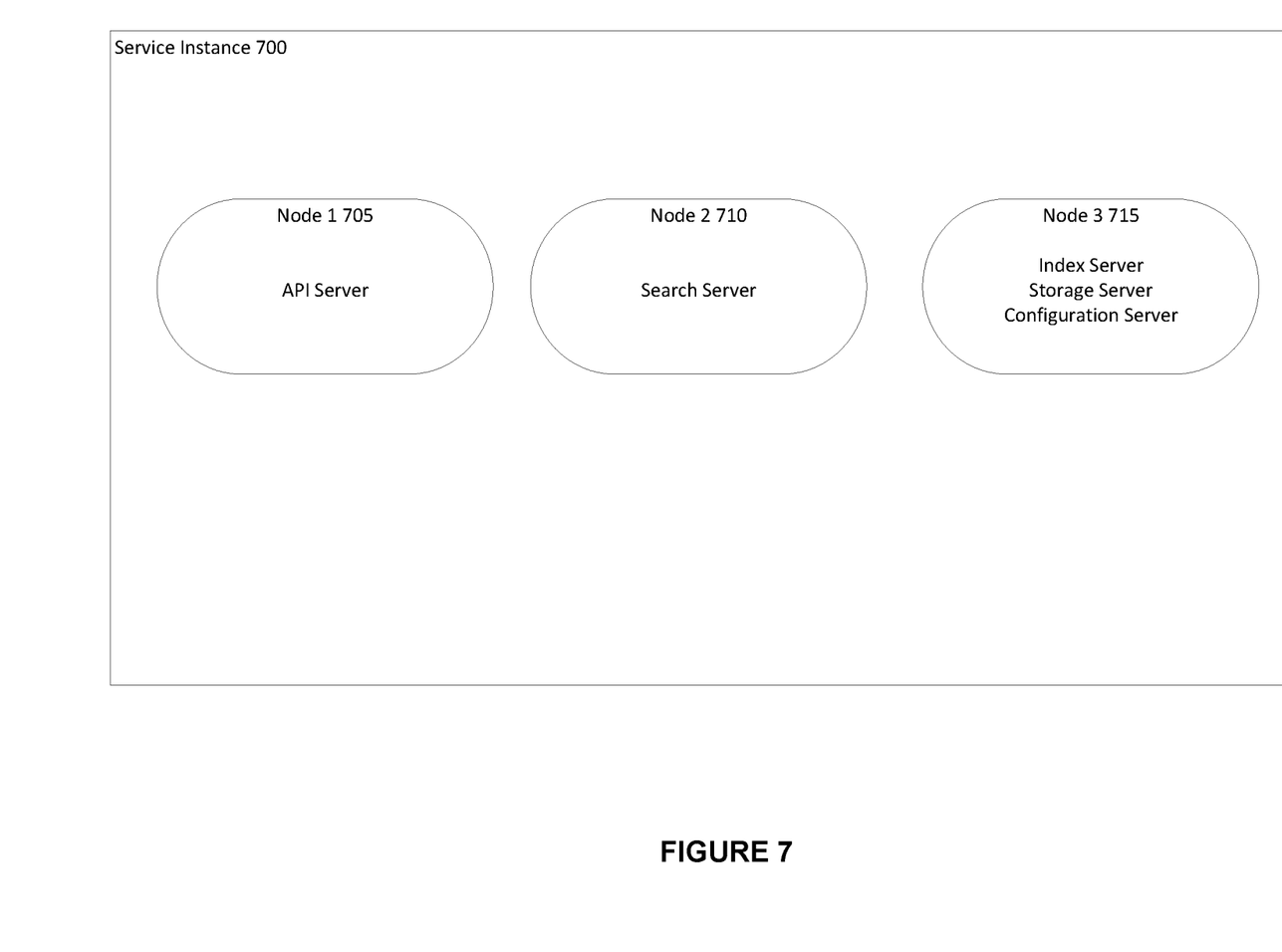
FIG. 7 shows a system for dynamic auto-scaling based on roles, in accordance with an embodiment.

FIG. 7 shows a system for dynamic auto-scaling based on roles, in accordance with an embodiment.

In accordance with an embodiment, FIG. 7 illustrates a theoretical search service 700 running the following nodes, Node 1 705, Node 2 710, and Node 3 715, with specific services running on each node. The service provides an API that is used for perform specific searches through the data that the service stores. The details of the API or the data that is stored is not important, but it gives us a sample service that has three specific functions: API (access), SEARCH (query, sort, etc.), DATA STORAGE and INDEXING. Each of these functions will have load based on how the service is used. For example, if the service is setup to contain a large amount of data, the storage server and indexes required may become large and require more compute or storage resources. This in turn could also mean that searching the data and providing sorts etc. could need additional memory, CPU, etc. If the number of requests that the service receives increases, the API server could become the bottleneck.

When the service is created, there can be one instance of each server: API, SEARCH, INDEX, STORAGE, and CONFIGURATION. Based on a server placement rule specified in the service definition, the INDEX, STORAGE, and CONFIGURATION server are placed on the same compute node, namely Node 3 715. This is done to, for example, co-locate data and indexes.

In accordance with an embodiment, the auto-scaling engine can follow cardinality (min/max and ratio for servers allowed) rules defined in a service blueprint. For example, the CONFIGURATION server can be responsible for providing a single point for software configuration. This CONFIGURATION server is a singleton server; only one of these servers can exist for an instance of the service 700.

Figure 8:
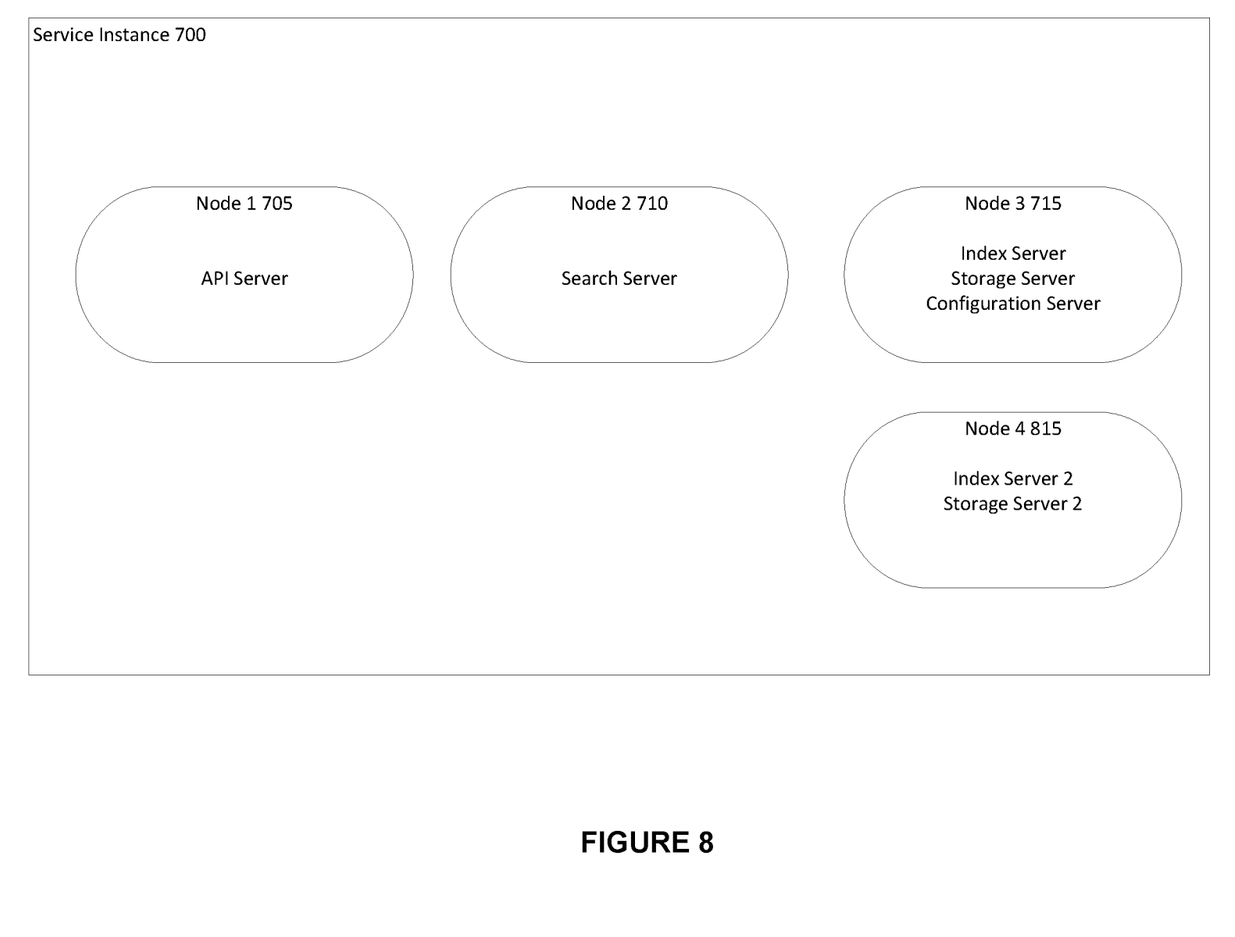
FIG. 8 shows a system for dynamic auto-scaling based on roles, in accordance with an embodiment.

FIG. 8 shows a system for dynamic auto-scaling based on roles, in accordance with an embodiment.

FIG. 8 depicts the system of FIG. 7, but after the auto-scaling engine determines that the MEMORY usage if high on Node 3, and requests duplication of Node 3. Node 4 815 can thus be created and have portions of the service be run therein. However, cardinality rules for the CONFIGURATION server indicates that only one server of this type is allowed as seen in the following declaration.

```
"serverTypes": {
  "CONFIGURATION": {
    "cardinality": "1 . . . 1",
    "vmTypes": {
      "DATA_NODE": { }
    },
```

In accordance with an embodiment, in this declaration, the CONFIGURATION server is defined, including the property indicating that it can run on a node type 'DATA_NODE' (the type of node for Node 3 715 in the sample service) and that there must be at least one of these servers and no more than one of these servers. Due to this declaration, the auto-scaling service will only duplicate the servers that are allowed within the bounds of the cardinality rules, namely the INDEX server and the STORAGE server (shown as duplicates in the Figure as Index Server 2 and Storage Server 2).

Figure 9:
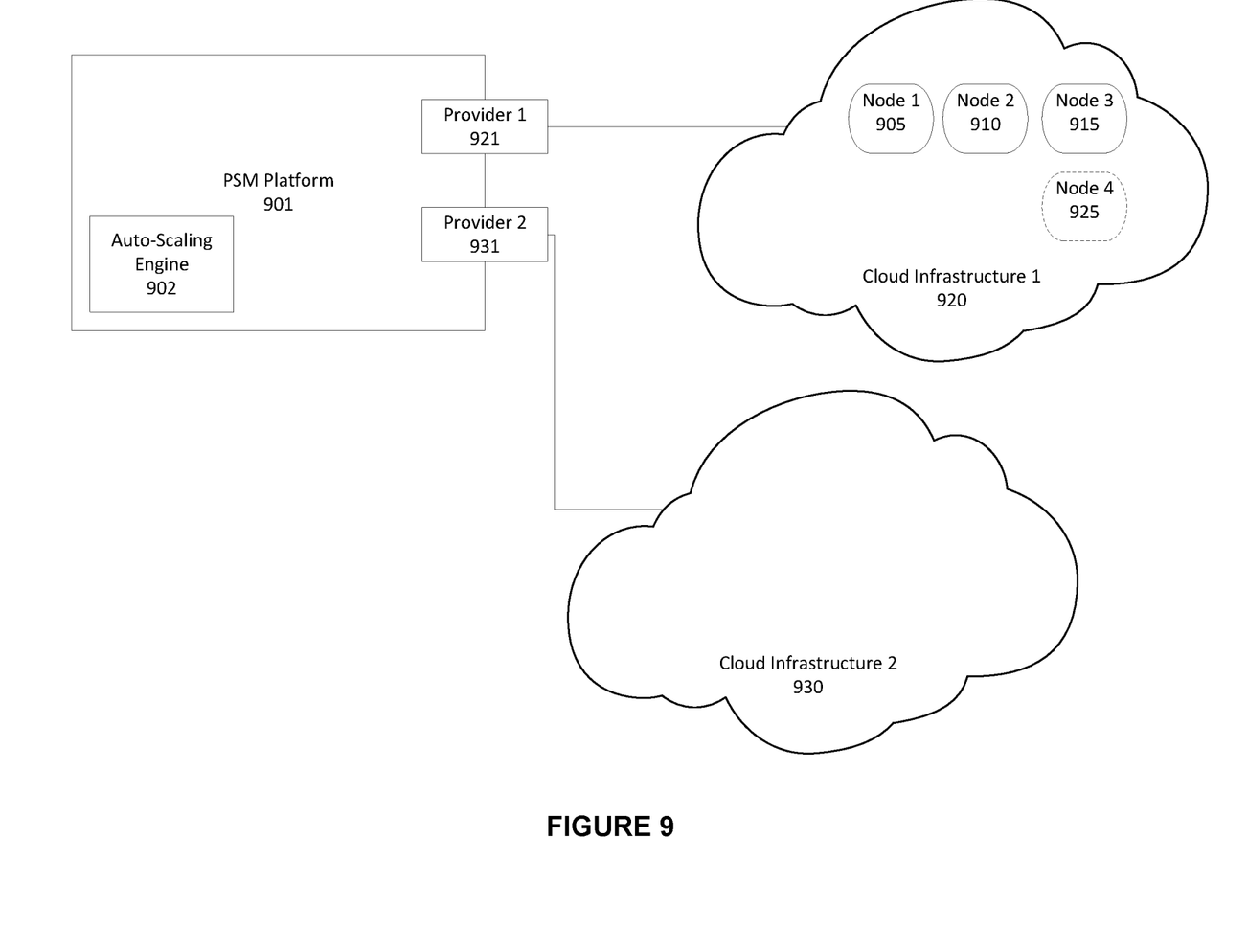
FIG. 9 shows a system for dynamic auto-scaling based on roles, in accordance with an embodiment.

FIG. 9 shows a system for dynamic auto-scaling based on roles, in accordance with an embodiment.

In accordance with an embodiment, a PSM platform is using (e.g., associated with) two distinct cloud infrastructures, namely Cloud Infrastructure 1 920 and Cloud Infrastructure 2 930. These two cloud infrastructures can be associated with different infrastructure models, such Nebula and OCI, for example. The PSM platform 901 can load different providers, depending on the cloud infrastructure models that are to be attached by the PSM Engine. In the depicted example, PSM platform has loaded Provider 1 921 and Provider 2 931. The platform can also be associated with, and in communication with, an auto-scaling engine 902. Upon loading the providers 921 and 931, the PSM platform can use a common interface to make a request to create compute nodes (shown within cloud infrastructure 1), attach storage and networks, and to open network traffic. As the PSM platform creates resources, it can retrieve an abstract handle to the resource (e.g., a resource object), which can be used by the provider. The handle can be saved for later management operations. The created compute nodes can comprise, for example, node 1 905, node 2 910, and node 3 915.

In accordance with an embodiment, FIG. 9 shows an evolution of the above described system after the auto-scaling engine determines that the CPU load is high on the Node 3. Upon such detection, the auto-scaling engine requests the metadata engine to make a duplicate of this node, namely Node 4 925 (shown in a dashed line to represent that node 4 is newly created within the depicted embodiment). This could be the result of the complexity of the data or perhaps a combination of the large number of requests and the size of the data. As part of the auto-scaling function, the service can also be instructed to scale-out the service, providing the properties of the search server to make another one like it.

In accordance with an embodiment, the service definition will control the type of node created and servers placed on that node. For example, if Node 3 915 was running a search server, then Node 4 925 can comprise the same role. This duplication logic will effectively scale the search function of the service and it should alleviate the high CPU consumption on the search node.

Figure 10:
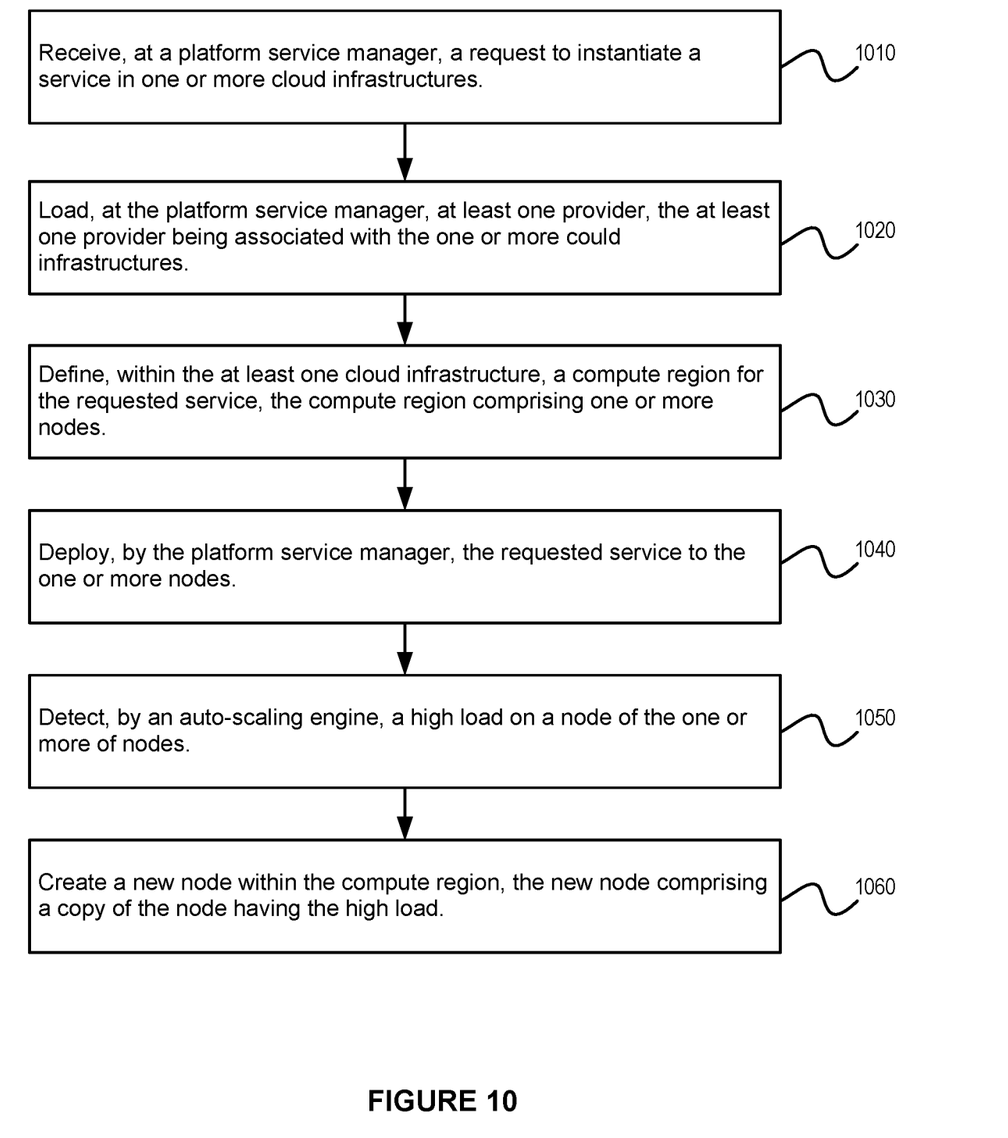
FIG. 10 is a flowchart of a method for dynamic auto-scaling based on roles, in accordance with an embodiment.

FIG. 10 is a flowchart of a method for dynamic auto-scaling based on roles, in accordance with an embodiment.

At step 1010, the method can receive, at a platform service manager, a request to instantiate a service in one or more cloud infrastructures.

At step 1020, the method can load, at the platform service manager, at least one provider, the at least one provider being associated with the one or more could infrastructures.

At step 1030, the method can define, within the at least one cloud infrastructure, a compute region for the requested service, the compute region comprising one or more nodes.

At step 1040, the method can deploy, by the platform service manager, the requested service to the one or more nodes.

At step 1050, the method can detect, by an auto-scaling engine, a high load on a node of the one or more nodes.

At step 1060, the method can create a new node within the compute region, the new node comprising a copy of the node having the high load.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. See, e.g. "The NIST Definition of Cloud Computing", Special Publication 800-145 (2011) which is incorporated herein by reference. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for managing a cloud service within a multi-node environment, comprising:
   a cloud infrastructure comprising one or more processors, and a plurality of nodes provided therein;
   a platform service manager adapted to manage the deployment of services to compute regions provided within the plurality of nodes, including:
      registering each service with a service blueprint that is configurable and defines a topology of the service, including resources required by the service and at least one cardinality rule;
      providing an interface that receives operations to manage the services deployed to the compute regions, including scaling of the services across the plurality of nodes in response to resource usage;
   wherein during processing of a deployed service within a compute region, the platform service manager operates to:
      determine when a resource use condition has been met by a first node within the compute region, the first node running a first server and a second server of the service as defined by the service blueprint, wherein the at least one cardinality rule defines the first server as a singleton server;
      determining one or more additional nodes within the compute region with a same topology as the first node, as indicated by the service blueprint; and
      deploying, without violating the at least one cardinality rule, the service to the one or more additional nodes, to scale the service deployed within the cloud infrastructure.

2. The system of claim 1, wherein the service blueprint is provided as a metadata model that uses a same API for the one or more additional nodes as an API used for the first node.

3. The system of claim 1, further comprising duplicating within the one or more additional nodes, a plurality of software services and applications running on the first node, as defined by the service blueprint.

4. The system of claim 1, further comprising duplicating within the one or more additional nodes, a configuration used in the first node, as defined by the service blueprint.

5. The system of claim 1, further comprising duplicating within the one or more additional nodes at least one of a cluster membership or memory configuration of software components used in the first node.

6. The system of claim 1, further comprising:
   wherein each of the plurality of nodes are defined to perform at least one role of the requested service;
   detecting a high load on a particular node of the plurality of nodes; and
   defining a new node within the compute region, the new node being defined to perform ae same role of a requested service as the particular node.

7. The system of claim 1, further comprising:
   receiving, at the platform service manager, a request to instantiate a service;
   deploying, by the platform service manager, the requested service to nodes having roles associated therewith, including determining, from a blueprint of the requested service, a set of roles associated with the requested service, and rules associated with the set of roles, for use by an auto-scaling engine;
   subsequently detecting, by the auto-scaling engine, a high load on a particular node; and
   creating, within the compute region, a new node comprising a copy of the particular node having the high load, to provide the requested service.

8. A method for managing a cloud service within a multi-node environment, comprising:

providing, at a cloud infrastructure comprising one or more processors, a plurality of nodes;

managing the deployment of services to compute regions provided within the plurality of nodes, including:

registering each service with a service blueprint that is configurable and defines a topology of the service, including resources required by the service and at least one cardinality rule;

providing an interface that receives operations to manage the services deployed to the compute regions, including scaling of the services across the plurality of nodes in response to resource usage;

during processing of a deployed service within a compute region:

determining when a resource use condition has been met by a first node within the compute region, the first node running a first server and a second server of the service as defined by the service blueprint, wherein the at least one cardinality rule defines the first server as a singleton server;

determining one or more additional nodes within the compute region with a same topology as the first node, as indicated by the service blueprint; and deploying, without violating the at least one cardinality rule, the service to the one or more additional nodes, to scale the service deployed within the cloud infrastructure.

9. The method of claim 8, wherein the service blueprint is provided as a metadata model that uses a same API for the one or more additional nodes as an API used for the first node.

10. The method of claim 8, further comprising duplicating within the one or more additional nodes, a plurality of software services and applications running on the first node, as defined by the service blueprint.

11. The method of claim 8, further comprising duplicating within the one or more additional nodes, a configuration used in the first node, as defined by the service blueprint.

12. The method of claim 8, further comprising duplicating within the one or more additional nodes at least one of a cluster membership or memory configuration of software components used in the first node.

13. The method of claim 8, further comprising:

wherein each of the plurality of nodes are defined to perform at least one role of the requested service;

detecting a high load on a particular node of the plurality of nodes; and defining a new node within the compute region, the new node being defined to perform ae same role of a requested service as the particular node.

14. The method of claim 8, further comprising:

receiving, at the platform service manager, a request to instantiate a service;

deploying, by the platform service manager, the requested service to nodes having roles associated therewith, including determining, from a blueprint of the requested service, a set of roles associated with the requested service, and rules associated with the set of roles, for use by an auto-scaling engine;

subsequently detecting, by the auto-scaling engine, a high load on a particular node; and creating, within the compute region, a new node comprising a copy of the particular node having the high load, to provide the requested service.

15. A non-transitory computer readable storage medium, including instructions thereon for managing a cloud service within a multi-node environment, which when read and executed by one or more computers cause the one or more computers to perform the steps comprising:

providing, at a cloud infrastructure comprising one or more processors, a plurality of nodes;

managing the deployment of services to compute regions provided within the plurality of nodes, including:

registering each service with a service blueprint that is configurable and defines a topology of the service, including resources required by the service and at least one cardinality rule;

providing an interface that receives operations to manage the services deployed to the compute regions, including scaling of the services across the plurality of nodes in response to resource usage;

during processing of a deployed service within a compute region:

determining when a resource use condition has been met by a first node within the compute region, the first node running a first server and a second server of the service as defined by the service blueprint, wherein the at least one cardinality rule defines the first server as a singleton server;

determining one or more additional nodes within the compute region with a same topology as the first node, as indicated by the service blueprint; and deploying, without violating the at least one cardinality rule, the service to the one or more additional nodes, to scale the service deployed within the cloud infrastructure.

16. The non-transitory computer readable storage medium of claim 15, wherein the service blueprint is provided as a metadata model that uses a same API for the one or more additional nodes as an API used for the first node.

17. The non-transitory computer readable storage medium of claim 15, the steps further comprising duplicating within the one or more additional nodes, a plurality of software services and applications running on the first node, as defined by the service blueprint.

18. The non-transitory computer readable storage medium of claim 15, the steps further comprising duplicating within the one or more additional nodes, a configuration used in the first node, as defined by the service blueprint.

19. The non-transitory computer readable storage medium of claim 15, the steps further comprising duplicating within the one or more additional nodes at least one of a cluster membership or memory configuration of software components used in the first node.

20. The non-transitory computer readable storage medium of claim 15, the steps further comprising:

wherein each of the plurality of nodes are defined to perform at least one role of the requested service;

detecting a high load on a particular node of the plurality of nodes; and defining a new node within the compute region, the new node being defined to perform ae same role of a requested service as the particular node.

* * * * *

UNITED STATES PATENT AND TRADEMARK OFFICE
CERTIFICATE OF CORRECTION

| | | |
|---|---|---|
| PATENT NO. | : 11,870,842 B2 | Page 1 of 1 |
| APPLICATION NO. | : 17/531134 | |
| DATED | : January 9, 2024 | |
| INVENTOR(S) | : Hansen et al. | |

It is certified that error appears in the above-identified patent and that said Letters Patent is hereby corrected as shown below:

In the Specification

In Column 9, Line 16, delete "fora" and insert -- for a --, therefor.

In the Claims

In Column 16, Line 60, delete "ae same" and insert -- a same --, therefor.

Signed and Sealed this
Seventh Day of May, 2024

Katherine Kelly Vidal
*Director of the United States Patent and Trademark Office*